United States Patent [19]
Cheshire

[11] Patent Number: 6,106,650
[45] Date of Patent: Aug. 22, 2000

[54] MANUFACTURING OF FIBRE REINFORCED COMPOSITES

[75] Inventor: Edward John Cheshire, New Alresford, United Kingdom

[73] Assignee: New Millenium Composites Ltd., Alton, United Kingdom

[21] Appl. No.: 08/935,697

[22] Filed: Sep. 23, 1997

[30] Foreign Application Priority Data

Oct. 1, 1996 [GB] United Kingdom ............ 9620408

[51] Int. Cl.$^7$ .................................................. C08L 23/12
[52] U.S. Cl. ................ 156/229; 156/62.2; 156/62.6; 156/62.8; 156/140; 156/160; 156/161; 156/163; 156/196; 156/245; 156/500
[58] Field of Search ................... 156/62.2, 62.6, 156/62.8, 140, 196, 148, 500, 160, 161, 163, 229

[56] References Cited

U.S. PATENT DOCUMENTS 5,203,940  4/1993  Krone ........................... 156/196
5,503,928  4/1996  Cheshire ........................ 428/357

OTHER PUBLICATIONS

International Publication No. WO 91/13195 to Edward Chesire entitled "Fibre Reinforced Composites," dated Sep. 1991.

*Primary Examiner*—Richard Weisberger
*Attorney, Agent, or Firm*—Watson Cole Grindle Watson, P.L.L.C.

[57] ABSTRACT

A method for manufacturing an article of fibre reinforced resin material includes the preparation of a reinforcement preform which includes one or more roves of staple fibres with sufficiently low twist to enable the fibres to slide relative to each other and thereby the rove to elongate when subjected to tension. The reinforcement preform is shaped by deforming the preform into the desired three dimensional shape of the article being manufactured. The shaping can be carried out before, after or simultaneously with impregnation with matrix material. The matrix material may be thermoplastic material incorporated in or with the preform.

14 Claims, No Drawings

MANUFACTURING OF FIBRE REINFORCED COMPOSITES

BACKGROUND OF THE INVENTION

1. Field of the Invention

This invention is concerned with the manufacture of reinforced composites having fibre reinforcing elements incorporated in a matrix. The invention is of particular relevance to the manufacture of shaped articles with fibre reinforcement within a resin matrix.

2. The Prior Art

As technology improves in relation to fibre reinforced composites, such materials are becoming used more and more in the manufacture of articles, especially for applications where high strength and light weight are desirable. In order to obtain the required strength characteristics, in the production of fibre reinforced composites the fibres must be controlled accurately as regards their positioning, orientation and amount. Sheet materials, i.e. essentially two dimensional products, are reasonably straightforward to manufacture, but three dimensional articles present considerable problems in regard to the control of the fibre reinforcement. For example, when a fibre mat or fabric is shaped by pressing in a mould, such as in a hemispherical mould cavity defined by male and female mould parts, there is a strong tendency for the fibre mat or fabric to fold and tear in an uncontrollable manner with the result that the fibre positioning will not be ideal for the article being produced and the article may have unacceptable weaknesses.

Reinforcement products used in the manufacture of fibre reinforced composites, such as woven fibre mats, frequently use continuous filaments in order to achieve maximum strength, but such filaments are incapable of stretching to conform to a three dimensional shape. Consequently, the amount to which such mats can deform is limited, especially if they are to be used to prepare a shaped reinforcement preform to be subsequently impregnated with and embedded in a matrix, such as thermosetting resin, metal or ceramic.

It is also known to use staple fibre yarns as reinforcement elements in reinforced composites, such as in spin winding processes wherein the yarn is wound onto a mandrel to build up layers of reinforcement. The yarns are generally produced with the fibres or filaments twisted so tightly that they are unable to slide relative to each other due to the friction between the fibres, and as a consequence the yarns will not elongate under tension and will break before stretching to any significant extent.

In WO 91/13195 (see U.S. Pat. No. 5,503,928) there is described a method of manufacturing a fibre reinforced composite wherein the reinforcement comprises a staple yarn of discontinuous fibres with low twist, which yarn is subjected to a preliminary controlled stretching with a view to obtaining desired characteristics in the finished composite. The stretched yarn can be used to produce a shaped preform which is subsequently impregnated with resin, e.g. during a separate moulding step. The need to produce a preform including a yarn which has been subjected to controlled stretching limits the potential of the described method for large scale production of shaped articles.

SUMMARY OF THE INVENTION

The present invention addresses this problem and as an especially neat and simple solution it provides a method of manufacturing an article of reinforced composite material, including preparing a reinforcement preform including a rove of staple fibres with low twist to enable the fibres to slide relative to each other and thereby the rove to elongate when subjected to tension, the rove being substantially unstretched and substantially uniform along its length in the completed preform, shaping the reinforcement preform by deforming the preform before, after or simultaneously with impregnation of the preform with matrix material so that the rove of staple fibres undergoes permanent elongation.

Roves of staple fibres can be oriented in the preform so that the desired characteristics are obtained in the finished article due to the stretching of the roves produced when shaping the preform being predictable and controlled. The reinforcement preform may be formed entirely of roves of staple fibres, but this is not essential and in some cases at least it will be possible to include other forms of reinforcement, such as continuous strand mat, continuous filaments, chopped stand mat, or the like.

By the method of the invention it is possible to mould conveniently three dimensional articles of reinforced composite material since a flat fibre assembly can be deformed to the required shape as the mould is closed while ensuring an appropriate distribution of the reinforcement fibres throughout the matrix material in the finished article.

In the case of a simple two dimensional preform of essentially sheet-like form, staple fibre roves may be laid side-by-side and parallel to each other. According to the nature of the article to be produced and in particular the stress loadings to which it is likely to be subjected in use, it may be sufficient for the roves to extend in a single direction. They could, if required, be sandwiched between layers of further reinforcement, such as continuous strand glass fibre mat or other extensible reinforcement. Alternatively, the roves could be laid in two or more layers with roves in different layers directed at different angles to obtain the desired strength characteristics in different directions. In regions or directions where little or no deformation is experienced during shaping of the preform, and hence no rove elongation will occur, continuous filaments may be incorporated with the roves, which may be desirable to impart additional strength to these regions in the finish article.

When a two dimensional or flat sheet preform is to be shaped in a three dimensional mould, it will generally be necessary to clamp the preform at least at some peripheral locations in order to control the deformation of the preform as the mould is closed.

A preform, whether in two or three dimensional form, may be stabilised to fix the fibres relative to each other temporarily until they are anchored in the matrix material. One stabilization technique is to sprinkle the fibres of the preform with a thermoplastic, e.g. polyester, binder powder and to heat the preform so that the binder melts and fuses the fibres. The binder can be dissolved in the matrix material, e.g. a thermosetting polyester resin, when the preform is subsequently impregnated in a mould. Alternatively, the binder may constitute part of the final matrix. By selective application of the binder, either by confining the areas of application or controlling the amount of binder applied, it is possible to adjust the tendency of the roves to stretch in certain locations during shaping of the preform and thereby control the portions of the preform which will be subjected to greatest deformation and elongation of the staple fibre roves to obtain the desired reinforcement distribution.

It may be preferable to prepare a three dimensional preform shaped to fit a mould for subsequent impregnation. Conveniently a two dimensional fibre preform is first produced and this preform is subjected to one or more pressing steps to achieve the desired shape. In the case of a simple shape a single pressing step in which the initial flat preform is deformed between complementary press tools will be adequate. When a more complex shape or a deep three dimensional form is required, a series of successive pressing steps may be employed. Fusing binder may be applied during or after any of the pressing steps either to assist control of the preform deformation in the next pressing stage or to maintain the final shape of the preform. The binder, which may be selectively applied as mentioned above, could be fused by heat or UV light. Another way to apply a binder is to spray the preform with an emulsion of a resin soluble binder in water, the water being removed by drying.

During a final preform pressing stage sufficient binder is preferably added to stabilise the preform until it is to be used, e.g. in a moulding operation. At this time up to 10% by weight of the preform may consist of binder. The periphery of the shaped preform may be trimmed, if necessary, to fit the mould employed for matrix impregnation. The trimming operation can be effected in any convenient manner, such as a cutting operation preformed during the final pressing stage by means of the press tooling, manually or by laser cutting. Trimming at this stage can avoid any need for a post moulding trimming operation.

The preform prepared for use in the method of the invention can be provided with holes and/or additional reinforcement elements as may be desired according to the article being manufactured.

As mentioned above, the preform prepared with the rove of staple fibres with low twist is shaped before or as the preform is inserted in a mould for impregnation. As an alternative, the initial sheet preform can be incorporated with a thermoplastic matrix material to be shaped and impregnated by application of heat and pressure. Thus, co-mingled fibre reinforcement and filaments of thermoplastic material which will melt to form the matrix can be pressed directly into a flat stock sheet or blanks from which shaped articles can be produced subsequently. As with other embodiments, the staple fibre rove(s) with low twist may constitute only part of the reinforcement. For example there can be utilised in addition continuous strand mats, or additional chopped strands of reinforcement. A two dimensional reinforcement preform sheet can be pressed at high pressure between two sheets of thermoplastic material, or other layers of material which will form the matrix, such as pellets of polypropylene, polyethyleneteraphthalate or nylon. Under the application of heat and pressure the thermoplastic material melts and impregnates the reinforcement preform. The resulting sheets or blanks can be heated and pressed or vacuum formed in accordance with conventional practices for deforming thermoplastic sheet into three dimensional configurations, but during such forming the lightly twisted fibres included in the rove of stable fibres will slide under applied tension forces resulting in an elongation of the rove. It will be understood that the matrix material needs to be melted sufficiently to enable such fibre movement and higher temperatures than usually employed in the performance of such thermoforming processes may be required to ensure the necessary reduced viscosity of the matrix material.

It will be understood that when the matrix material is initially provided in the form of fibres or filaments co-mingled with the reinforcement fibres, it is not essential to prepare a flat composite preform for further forming to the required shape and, the preform of reinforcement and matrix fibres can be directly formed into a finished shaped article by applying pressure with heating to a temperature sufficient for the thermoplastic material to melt and impregnate the reinforcement.

As a variation of the method in which the fibre reinforcement including the rove of staple fibres is combined with filaments of thermoplastic material which are melted to provide the matrix, if the fibres are themselves formed of a thermoplastic material they can themselves provide the matrix using a technique known as "hot compaction". In such a method a bundle of oriented thermoplastic fibres is subjected to pressure and heating so that the fibres melt at their surfaces and the melted material fills the voids between the fibres and upon subsequent cooling forms a strong bond between the fibres. The product of this method can be seen as a single phase composite inasmuch that the same material forms the reinforcement and the matrix. A preform can be prepared and be compacted, e.g. by pressing or in an autoclave, to the final shape. Alternatively, as the material is thermoplastic, hot compaction can be used to produce a preform, e.g. a sheet, which can be post formed to a final shape. The rove of staple fibres in the fibre bundle will be subjected to elongation, either before or after incorporation in the bundle of fibres, prior to hot compaction in order to obtain the desired characteristics in the finished article being manufactured. Alternatively it could be possible for such elongation to be produced during the hot compaction process.

The present invention includes within its scope a blank or preform for use in performing the method of the invention and including a rove of staple fibres of sufficiently low twist that the rove is elongated under tension applied during shaping of the preform.

Furthermore the invention also extends to an article produced by the method.

By the rove of staple fibres being substantially unstretched and substantially uniform along its length when the preform is initially prepared, it is meant that the rove has not been subjected to a deliberate stretching operation to reduce its cross-section or the number of fibres incorporated in the rove at any point along its length so that the properties, in particular the weight per unit length of the rove, remain substantially constant along the length of the rove. The important aspect of the invention is that the rove is subjected to a degree of elongation, without the rove being parted at any location along its length, during a subsequent forming operation to shape the reinforcement in conformity with the article of reinforced composite material being manufactured.

In many instances it will be convenient and appropriate initially to prepare the preform in a flat condition. However, this is not essential and the preform can be prepared with an initial three dimensional form and be subsequently deformed to the desired shape and to effect the elongation of the roves of staple fibres with low twist.

The length of fibres in the rove of staple fibres used in preparing a preform in accordance with the invention is not crucial but is an important consideration. Although the ideal length will depend on the dimensions of the article being produced and in particular the distances between pinch points where no or very little elongation will occur during the shaping deformation of the preform. If the fibres are short, there may be a tendency for the rove to part at a point at which initial elongation takes place. Long fibres are generally desirable from a strength point of view, but the fibres should not be so long that more than a very small percentage extend between the pinch points since these fibres must clearly be broken to enable elongation of the rove. Preferably the fibre length, is such that elongation will occur substantially evenly over a major portion of the rove length between pinch points. This will ensure the reduction in the number of fibres in the rove at any position along the length, due to the stretching, is minimised.

The fibres used in performance of the invention can be of any known type including glass, carbon or aramid.

What is claimed is:

1. A method of manufacturing an article of reinforced composite material, comprising the steps of preparing a reinforcement preform including a rove of staple fibres with sufficiently low twist to enable the fibres to slide relative to each other and thereby the rove to elongate when subjected to tension, the rove being substantially unstretched and substantially uniform along its length in the initially completed preform, introducing the reinforcement preform into a mould, delivering liquid resin matrix material into the mould to impregnate the preform, and shaping the reinforcement preform by deforming the preform before, after, and/or simultaneously with impregnation of the preform with matrix material so that said rove of staple fibres undergoes permanent elongation.

2. A method according to claim 1, wherein the preform is prepared entirely from roves of staple fibres of sufficiently low twist to enable the fibres to slide relative to each other and thereby enable each rove to elongate when subjected to tension.

3. A method according to claim 1, wherein the preform is prepared from one or move roves of staple fibres in combination with at least one other form of fibre reinforcement selected from the group consisting of continuous strand mat, continuous filaments, and chopped strand mat.

4. A method according to claim 1, wherein several roves of staple fibres with low twist are laid side-by-side and substantially parallel to each other.

5. A method according to claim 1, wherein the preform comprises a substantially flat sheet.

6. A method according to claim 5, wherein the flat sheet preform is clamped at at least some peripheral locations prior to shaping the preform.

7. A method according to claim 1, wherein reinforcement fibres included in the preform are stabilised to temporarily fix the fibres relative to each other until they are anchored in the matrix material.

8. A method according to claim 7, wherein the reinforcement fibres are stabilised by a binder.

9. A method according to claim 8 wherein the binder is applied to the fibres as a thermoplastic powder, and heated to melt the binder and fuse the fibres.

10. A method according to claim 8, wherein the binder is applied by spraying an emulsion of binder in water onto the fibres, and drying to remove the water.

11. A method according to claim 8, wherein the binder is selectively applied at predetermined areas of the preform.

12. A method according to claim 8, wherein the preform is shaped by deforming in at least two successive stages, and binder is applied during or after any one or more of the deformation stages.

13. A method according to claim 1, wherein the preform is trimmed at the edges before impregnation with matrix material.

14. A method according to claim 1, wherein the preform is shaped by closure of the mould around the preform.

* * * * *